(12) United States Patent
Bourgeois et al.

(10) Patent No.: US 6,201,763 B1
(45) Date of Patent: Mar. 13, 2001

(54) DEPTHIMETER

(75) Inventors: Brian S. Bourgeois, Slidell; Andrew B. Martinez, New Orleans, both of LA (US); Michael M. Harris, St. Louis, MS (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/399,474

(22) Filed: Sep. 20, 1999

(51) Int. Cl.[7] .................................................. H04B 17/00
(52) U.S. Cl. ................................. 367/12; 367/13; 367/107
(58) Field of Search .............................. 367/99, 107, 115, 367/12, 13

(56) References Cited

U.S. PATENT DOCUMENTS

| | | | |
|---|---|---|---|
| 2,958,846 | * 11/1960 | Luskin | 367/115 |
| 4,104,608 | 8/1978 | Mellina et al. | 367/12 |
| 4,697,253 | 9/1987 | Lind et al. | 367/12 |
| 4,986,121 | 1/1991 | Luscombe | 73/170 |

OTHER PUBLICATIONS

Bourgeois et al.: Autonomous Bathymetry Survey System: IEEE Trans. Onoe; vol. XX, No. Y.: pp. 100–108; 1999.

* cited by examiner

*Primary Examiner*—Daniel T. Pihulic
(74) *Attorney, Agent, or Firm*—John J. Karasek; Charles J. Stockstill

(57) ABSTRACT

The depthimeter comprises a heave sensor, a mean path compensator and a combiner. The mean path compensator comprises a ranging device which measures the instantaneous distance of the vehicle from a fixed point on the vehicle to ocean surface as a function of time; a range compensator to compensate for signal dropouts in the ranging devices data, for sensor offset angle, and vehicle pitch and roll, thereby providing a signal that contains the vehicles vertical motion and the vertical motion of the sea surface. A low-pass filter within the mean path compensator eliminates the components of the resulting signal due to the motion of the sea surface and the high frequency components of the vehicle's vertical motion, thereby producing a signal that is the mean path of the vehicle, referenced to mean sea level. The combiner merges the mean path signal from the mean path compensator and a heave signal generated by the heave sensor to generate a signal that is a surface vehicle's draft relative to mean sea level or a submerged vehicle's depth relative to mean sea level. This signal is also the vehicle's vertical displacement with time relative to mean sea level.

32 Claims, 6 Drawing Sheets

DEPTHIMETER

BACKGROUND OF THE INVENTION

1. Field of the Invention

This invention pertains generally to a device for determining the draft of a surface vessel or the depth of a submerged vehicle and more particularly to the accurate measurement of these quantities relative to mean sea level.

2. Description of the Related Prior Art

A surface vehicles draft is traditionally measured by observing the position of the waterline on hull draft markings. However, it is not feasible to accurately estimate draft in this way when there is wave action. Also, this measurement cannot be accomplished while the vehicle is underway. Another method for measuring draft of a vehicle is by estimation through computation by accounting for the loading of fuel, water and cargo on the vehicle. This is not accurate and does not compensate for squat and lift effects when the vehicle is moving. Squat and lift cause changes in a vehicles draft as a function of vehicle speed, water current and water depth and cannot be accurately computed.

When in close proximity to a shore having a kinematic Global Positioning System (GPS) which measures vehicle position with respect to a GPS reference point, the draft is computed by adjusting the GPS reference point for the tide level at the vehicle's position. Accurate tide level requires placement of a tide sensor in the proximity of the vehicle. Because of the requirements for off-board sensors, this approach is not generally practical for a transiting vehicle.

In submerged vehicles, depth is traditionally measured by a pressure sensor. With this method of measurement errors occur due to head pressure effects and fluid flow over a moving vehicle; pressure effects due to wave action when the vehicle is near the surface; vertical current components in the water through which the vehicle is moving; and changes in the water density due to temperature or salinity changes.

An acoustic ranging device can be used to determine the travel time of an acoustic pulse, and thus the distance, from the vehicle to the water's surface. For near surface applications the measured range signal is contaminated by surface wave action. Measurement of vertical displacement can also be achieved for a subsurface vehicle using a pressure depth sensor, but the same errors are experienced as discussed above for measuring vehicle depth.

The measurement of vertical displacement for a surface or subsurface vehicle is traditionally accomplished using a heave sensor. A typical heave sensor uses accelerometers to measure the vertical acceleration of the vehicle in order to generate heave. The state of the art heave for sensors, is shown in U.S. Pat. No. 4,986,121; APPARATUS FOR MEASURING THE VERTICAL MOTION OF A FLOATING PLATFORM; Luscombe; Jan. 22, 1991; U.S. Pat. No. 4,697,253; SONAR HEAVE COMPENSATION SYSTEM; Lind et al.; Sep. 29, 1987; and U.S. Pat. No. 4,104,608; HEAVEMETER; Melling et al.; Aug. 1, 1978. These devices compute heave by double integrating measured vertical acceleration of the vehicle to obtain vertical displacement (heave). Due to the double integration there are two unknown constants of integration and the average value of this signal is thus meaningless and is removed in the heave sensor using a high pass filter. Due to the employment of the high pass filter in a heave sensor, the output cannot be correctly interpreted as vertical displacement after abrupt changes in the vehicle's mean path. The result is a signal that is the heave of the vehicle about an unknown mean path; a heave of zero indicates no vertical displacement from this path. This method of measuring vertical displacement is effective in cases where the mean path of a vehicle does not change or changes very slowly with time. With a heave sensor, knowledge of the vertical position of a vehicle with respect to an earth reference frame requires addition of the heave to draft or depth.

Due to the employment of a high pass filter in the heave sensor, however, the heave signal cannot be used as the vertical displacement of the vehicle after abrupt changes in the vehicle's mean path. FIG. 1 shows the unit step response of a typical heave system high pass filter, denoted G(s). In FIG. 1, the the sensor is moved 1 unit upward at time zero and left in that position, representing the new mean path. It is evident in FIG. 1 that this change in mean path results in a long transient (several minutes) that represents an error in vertical displacement from the new mean path. Changes in a surface vehicles mean path, i.e., draft, may occur due to a change in loading or due to squat and lift effects. Changes of a submerged vehicle's mean path, i.e., depth, may occur due to a change in the command depth.

SUMMARY OF THE INVENTION

The object of this invention is to provide a device for accurately measuring a surface vehicles draft relative to mean sea level.

Another objective of this invention is to provide a device for accurately measuring a submerged vehicle's depth relative to mean sea level.

Another objective of the invention is to provide a device for accurately measuring the vertical displacement of a vehicle relative to mean sea level.

These and other objectives are achieved by the depthimeter comprising a mean path compensator, a heave sensor, and a combiner. The mean path compensator comprises a ranging device which measures the instantaneous distance from a fixed point on the vehicle to the ocean surface as a function of time; a range compensator to compensate for signal dropouts in the ranging devices data, for sensor offset angle, and vehicle pitch and roll, thereby providing a signal that includes the vehicles vertical motion and the vertical motion of a sea surface; and a low-pass filter within the mean path compensator that eliminates the component of the resulting signal due to the motion of the sea surface and the high frequency component of the vehicle vertical motion, thereby producing a signal that is the mean path of the vehicle, relative to mean sea level. The heave sensor uses accelerometers to measure the vertical acceleration of the vehicle which is double integrated and filtered to produce heave. The combiner merges the mean path signal from the mean path compensator and a heave signal generated by the heave sensor to generate a signal that is a surface vehicle's draft relative to mean sea level or a submerged vehicle's depth relative to mean sea level, and is also the vehicle's vertical displacement relative to mean sea level.

DESCRIPTION OF THE PREFERRED EMBODIMENT

For the purposes of this specification, like elements performing like functions are assigned the same reference number throughout the specification.

Figure 2:
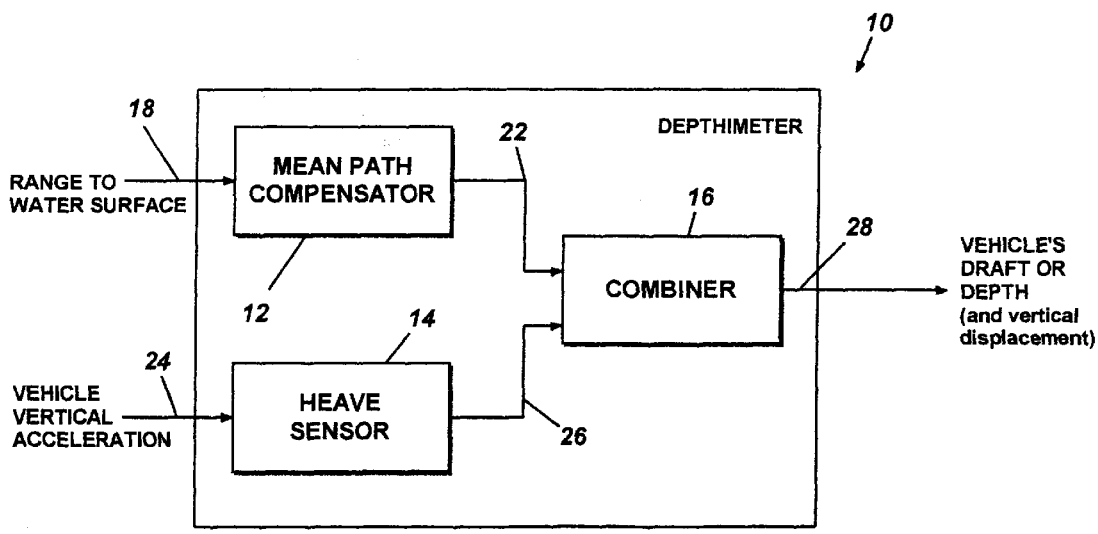
FIG. 2 a block diagram of a depthimeter

In a preferred embodiment, the depthimeter 10, as shown in FIG. 2, is used for the determination of the draft of a surface vehicle and for the determination of vertical displacement of the vehicle relative to mean sea level.

FIG. 2 is a top-level functional block diagram of the depthimeter 10. The depthimeter 10 may be implemented as a digital or an analog system, preferably, a digital system. In this embodiment, the parameters measured by the depthimeter 10 are range from a fixed point on the vehicle to the water's surface and vehicle's vertical acceleration.

In this embodiment, as shown in FIG. 2, the depthimeter 10 is comprised of a mean path compensator (MPC) 12, a heave sensor 14 and a combiner 16. The mean path compensator 12 measures the range to the water surface 18 and generates a signal that is the mean path of the vehicle relative to mean sea level 22. This signal 22 may be time varying if the vehicle's draft changes with time. The mean path compensator 12 eliminates the component due to wave height and high frequency vehicle vertical motion from the range measurement, and the estimate of mean path is precisely matched to the missing component in the heave to completely compensate for transients in the heave. The heave sensor 14 measures the vehicle's vertical acceleration 24 and generates a signal 26 that is the heave of the vehicle. The heave signal 26 does not contain information about the mean path of the vehicle. The combiner 16 takes the heave signal 26 and the mean path signal 22 and generates a signal that is the vehicle's draft as well as the vehicle's vertical displacement relative to mean sea level 28.

Figure 1:
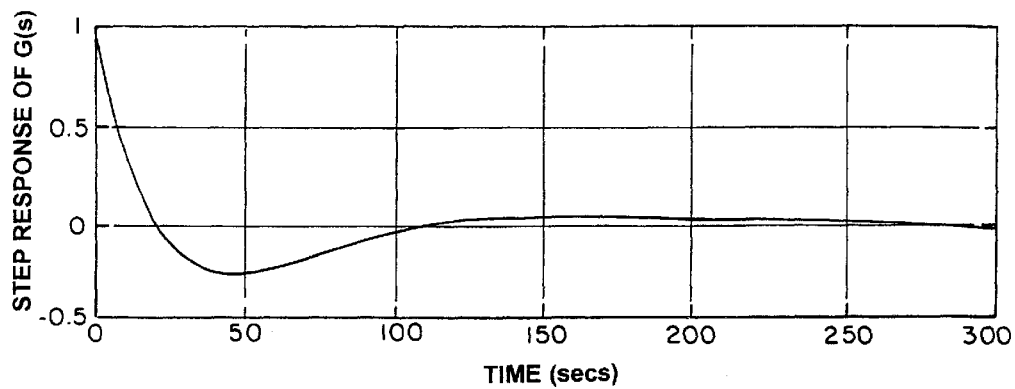
FIG. 1 shows a unit step response of a typical heave system high pass filter.
Figure 3:
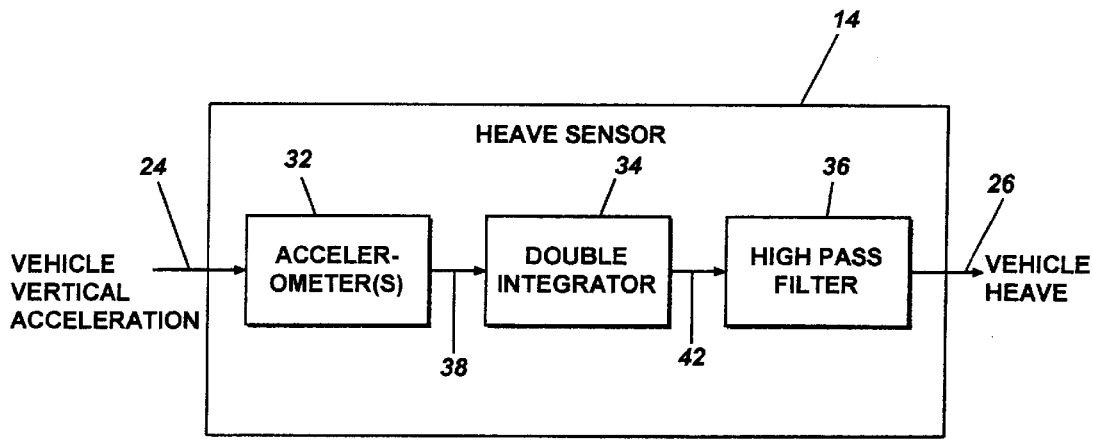
FIG. 3 shows a block diagram of a heave sensor.

The heave sensor 14, as shown in FIG. 3, is a commercial item, such as a Model POS/MV 320, manufactured by Applied Analytics of Markham, Ontario, Canada. or equivalent, and may be either an analog or digital device. A typical heave sensor 14 comprises an accelerometer package 32, a double integrator 34 and a high-pass filter 36. The heave sensor 14 measures the vertical acceleration 24 of a vehicle. The output of the heave sensor 14 is a vehicle's heave 26, the vertical displacement of the vehicle about its mean path. A vehicle's heave being defined as that component of the vehicle's vertical displacement, with respect to a fixed vertical reference point, that is absent in the vehicle's mean path. The heave signal 26 does not contain information about the mean path of the vehicle 64. The accelerometer package 32 directly measures the vertical acceleration 38 of the vehicle, to obtain the vertical displacement 42 the double integrator 34 double integrates the vertical acceleration 38 signal. Due to the double integration there are two unknown constants of integration and the average value of this signal 38 is thus meaningless and is removed in the heave sensor 14 using a high-pass filter 36. The result is a heave signal 26 that is the vertical displacement of the vehicle about an unknown mean path. A heave of zero indicates no vertical displacement from this mean path. This technique of measuring vertical displacement is effective in cases where the mean path of a vehicle does not change or changes very slowly with time. Knowledge of the vertical position of a vehicle with respect to an earth reference requires addition of the heave 26 to draft. Due to the employment of the high-pass filter 36 in the heave sensor 14, however, the heave signal 26 cannot be used as the vertical displacement of the vehicle after abrupt changes in the vehicle's mean path. As previously noted, the unit response of a typical heave system 14 high-pass filter 36, denoted G(s), is shown in FIG. 1. In this figure, the heave sensor 14 is moved one unit upward at time zero and left at that position, representing a new mean path. This change in mean path results in a long transient (several minutes) that represents an error in vertical displacement from the new mean path. Changes in a surface vehicle's mean path may occur due to changes in loading or due to squat and lift effects.

If the heave sensor 14 is not collocated with the ranging device 44, the heave measured at the position of the heave sensor 14 may not be the same as the position of the ranging device 44. If this is the case, then the heave data must be translated, using measured vehicle pitch and roll, to compute the heave of the vehicle 52 at the location of the ranging device. This may require an additional sensor, a vertical reference unit, for the measurement off vehicle 52 pitch and roll. If the POS/MV 320 system is utilized, it also measures vehicle 52 pitch and roll. Given measured pitch and roll, translation of the heave measurement is well known to those skilled in the art.

Figure 4:
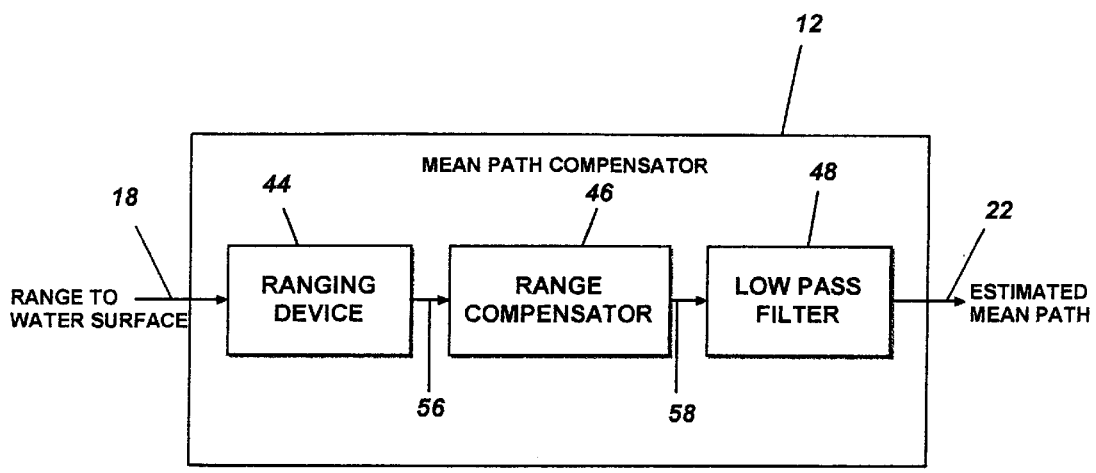
FIG. 4 shows a block diagram of a mean path compensator.

The mean path compensator (MPC) 12, as shown in FIG. 4, measures the instantaneous distance from a fixed point on the vehicle to the ocean surface as a function of time. The output 22 of the MPC 12 is the mean path of the vehicle relative to mean sea level. The MPC 12, preferably, is a digital device, however, it may be an analog device. The MPC 12 comprises a ranging, device or sensor 44, a range compensator 46 and a low-pass filter 48.

The ranging device 44 is used to measure $r_{meas}$ 56, the instantaneous range from a fixed point on the vehicle to the ocean surface as a function of time. Measurement of range is accomplished by measuring the time required for a transmitted pulse to travel from the device 44 to the surface and back to the device 44; the pulse would typically be acoustic for the ranges discussed herein. This device 44, preferably, is a combination of analog and digital components, but it may be all analog or all digital. The measured range signal contains two components— the instantaneous vertical displacement of the vehicle relative to mean sea level and referenced to the vertical position of the ranging device, and the vertical motion of the sea surface (wave height).

Figure 5:
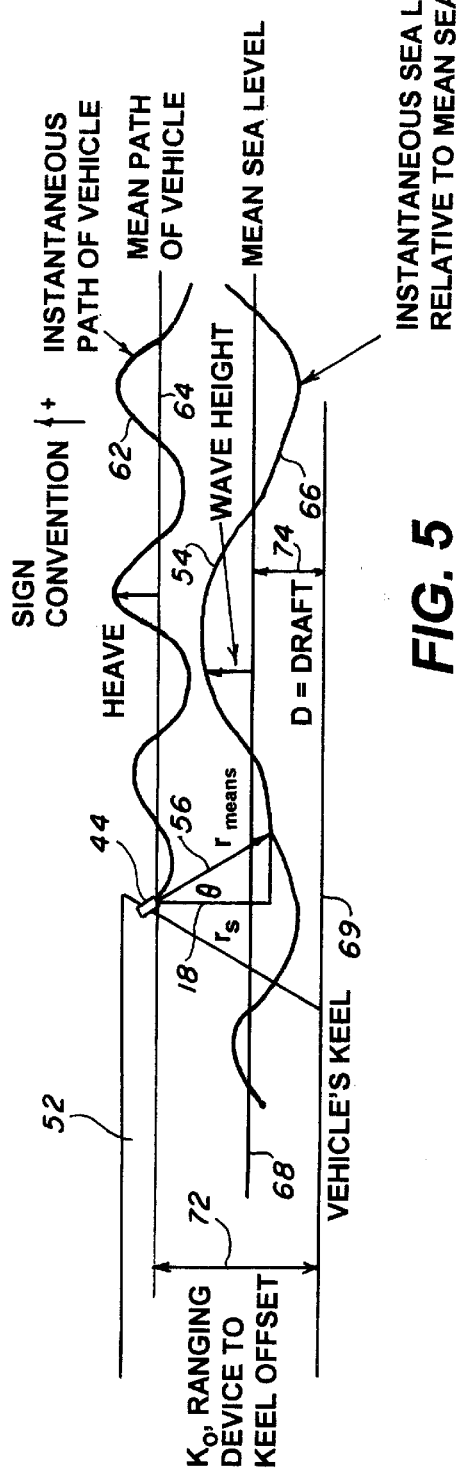
FIG. 5 shows a depthimeter for surface vehicle application.

As shown in FIG. 5, the ranging device 44 measures the range from its position on the vehicle 52 to the ocean surface 54; $r_{meas}$ 56. The ranging device 44 for a surface vehicle 52 is a device such as a Level Metrics 2002, manufactured by UltraSound Solutions of Albany, N.Y. This range measurement is corrected to produce the vertical distance to the sea surface, $r_s$, by applying the range device mounting angle, $\theta$, which is the vertical offset of the ranging device 44. If the vehicle 52 pitch and roll are large, then the measured range, $r_{meas}$ 56, must be corrected for vehicle 52 pitch and roll. This correction is well known to those skilled in the art.

For bow mounting of the ranging device 44 on a surface vehicle 52 it must be oriented so that its beam strikes the water's surface, or instantaneous sea level relative mean sea level 66 clear of the vehicle's 52 wake. The wake of the vehicle 52 would cause an erroneous offset in the measured range 56. Typically this requirement will exclude mounting on the sides or the stern of the vehicle 52. In the bow mounting the ranging device 44 may be placed on a rigid structure extending far enough beyond the bow to avoid wake contamination. The mounting of the ranging device 44 must be rigid to the hull of the vehicle 52. Any independent motion or vibration of the ranging device 44 with respect to the vehicle's 52 hull mount may result in contamination of the measured range signal 56. The mounting of the ranging device 44 must be such that the angle, θ, of the ranging device 44 with respect to the vehicle's vertical reference is measurable. Since it is desired to measure the vertical distance from the ranging device 44 to the sea surface 54, any angular offset of the ranging device 44 from vertical must be known so that the measured non-vertical range can be corrected to produce the vertical range $r_s$. Angular offset is determined analytically at the time the ranging device 44 is installed on the vehicle 52 by actual measurement of the angle offset.

Figure 6:
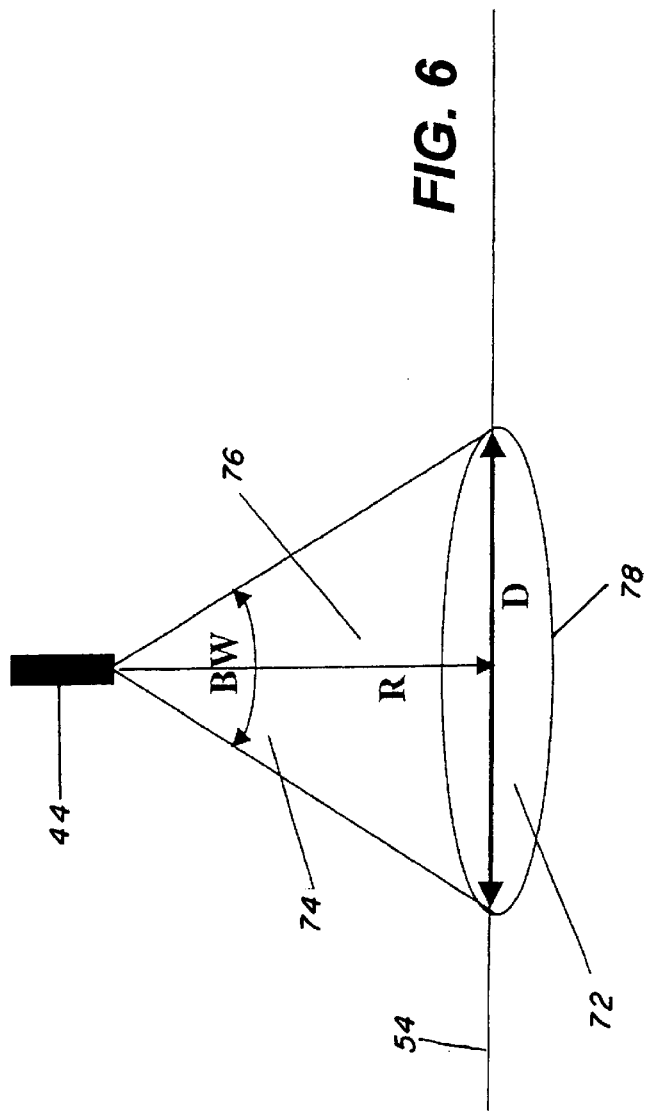
FIG. 6 shows a ranging device footprint and beam width.

Selection of a ranging device 44 for a particular implementation involves several considerations. For ranging devices 44, the beam is usually directional, resulting in a finite angular beam width. A ranging device's 44 beam typically has a footprint that is circular when projected onto a flat surface perpendicular to the direction of the beam, and this is illustrated in FIG. 6. The size of the beam's footprint 78 is a function of the beam width 74 and the range to the surface 76. The footprint's diameter 72 is given by the formula $$D=2*R*\tan(BW/2)$$

where D id the footprint diameter 72, R, is the range to the water surface 76, and BW is the angular beam width 74. A beam width 74 in the range of 5–30 degrees is likely to be adequate for most implementations.

When selecting a beam width 74, the following considerations should be addressed. If the beam width 74 is too narrow the beam may reflect off the water's surface in the opposite direction, and the ranging device 44 would be unable to produce a valid range 76. This condition will be accentuated in very calm water. In general, a wider beam width will not adversely impact the depthimeter's 10 operation. A wider beam effectively low pass filters the measured range data, but since this signal is subsequently low pass filtered in the MPC 12 there are no negative consequences. If the beam is very wide, then the vehicle's 52 bow wake or the vehicle's 52 hull could fall within the beam and contaminate the measured range signal 76.

The effective range of a ranging device 44 must be sufficient considering the size and bow configuration of the vehicle 52, the placement of the ranging device 44 on the vehicle 52, and the anticipated wave heights. The resolution and accuracy of the ranging device 44 dictates in part the overall accuracy of the depthimeter 10. An accuracy of 5 cm or less is likely adequate for most implementations. The resolution should be smaller than the accuracy, 1 cm or less.

Aliasing is an adverse phenomenon that occurs due to improper sampling of a signal and is well known to those skilled in the art. When aliasing occurs, high frequencies in the original signal are erroneously produced as low frequencies in the sampled signal; the effect is undetectable and uncorrectable in the sampled signal. In using a ranging device 44, aliasing of the measured range 76 can be prevented by ensuring that the footprints 78 from consecutive pulses overlap. For a maximum relative wave speed and the nominal range of the ranging device 44 from the water's surface 54, the footprint 78 overlap can be increased by increasing the ranging device's 44 beam width 74, or by increasing the pulse repetition rate. The maximum relative wave speed is given by the sum of the maximum assumed vehicle speed and the maximum assumed wave speed. Ranging devices 44 will typically have fixed beam widths 74, governed by the physical transducer construction, but may have variable pulse repetition rates. For example, consider an implementation where the maximum relative wave speed is assumed to be 10 meters/sec (20 knots), the ranging device 44 is mounted 4 meters above the water's surface 54, and the ranging device 44 has a 10 degree beam width. For this implementation a sampling rate of 15 samples/second is required to ensure beam footprint 74 overlap.

Figure 7:
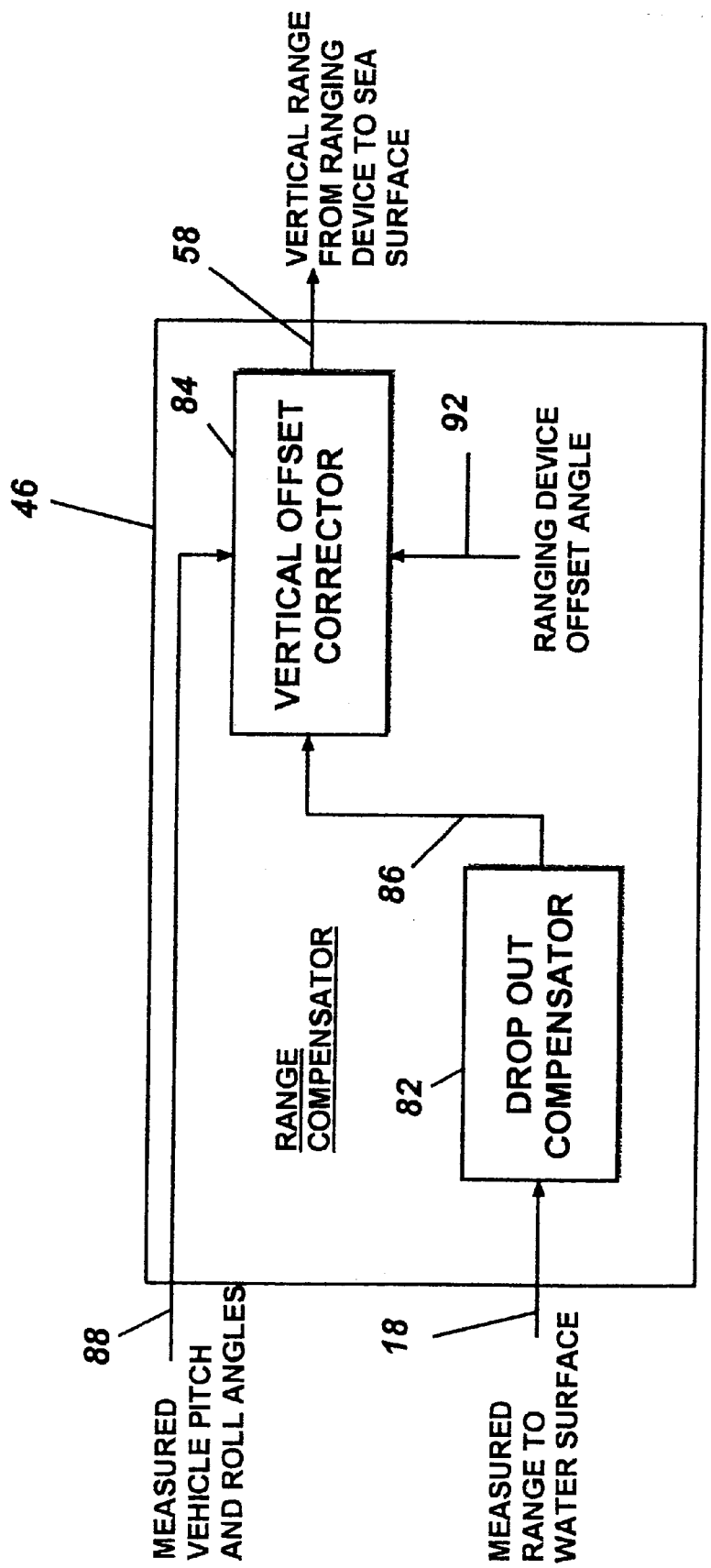
FIG. 7 shows a block diagram of a range compensator.

The range compensator 46, as shown in FIG. 7, has two functions: first it corrects for data dropouts and secondly it corrects for the error in the measured range due to non-vertical orientations of the ranging device 44. The range compensator 46 receives the range measurement 18 from the ranging device 44, $r_{meas}$, and outputs 58 the vertical range 18, $r_s$, from the ranging device 44 to the ocean surface 54. The range compensator 46 is composed of a dropout compensator 82 and a vertical offset compensator 84.

The dropout compensator 82 receives the range measurement 18, $r_{meas}$, from the ranging device 44 and generates an output 86 free of data dropouts. Since the beam of the ranging device 44 may reflect off of the ocean surface 54 away from the sensor 44, particularly for smooth surfaces, data dropouts may occur. This problem may occur more often if the ranging device 44 has a fairly small beam width. To compensate for this, interpolation is used between adjacent good data points from the ranging device 44 to estimate the missing points. Interpolation of sampled data is well known to those skilled in the art.

The vertical offset compensator 84 receives the dropout compensated signal 86 from the dropout compensator 82 and vehicle pitch and roll 88 from an external, sensor (not shown), such as a Model POS/MV 320, manufactured by Applied Analytics of Markham, Ontario. Canada. or equivalent. The vertical offset compensator 84 outputs 58 a vertical range, $r_s$, from the ranging device 44 to the ocean surface 54. The vertical offset compensator 84 corrects the error in range measured by the ranging device 44 for any offsets of the ranging device 44 from vertical. Offsets from the vertical may be due to the ranging device 44 mounting angle θ resulting in a constant offset angle from vertical. Offsets from the vertical may also be due to vehicle 52 pitch and roll which will change with time. Compensation of a measured distance for an offset angle is well known to those skilled in the art.

The corrected range output signal 58 contains two components; first the instantaneous vertical displacement of the vehicle 52 relative to mean sea level 68 and secondly the vertical motion of the sea surface 54 (wave height). One consequence of the low pass filter 48 is that those portions of the signal due to the vertical motion of the sea surface 54 are removed. A second consequence of the low pass filter 48 is that those portions of the signal 58 due to the instantaneous vertical displacement of the vehicle that exactly match the signal 26 from the heave sensor 14 are removed. This is accomplished by using a low pass filter 48 that is the complement of the high pass filter 36 used in the heave sensor 14. As a result of the low pass filter 48, the output 22 of the MPC 12 contains exactly those components of the vehicle's 52 vertical motion that are missing in the output 26 of the heave sensor 14. By adding the output 22 of the MPC 12 and the output 26 of the heave sensor 14, as is done in the combiner 16, the final output 28 of the depthimeter 10 is free from the transients seen in the output 26 of the heave sensor 14 due to sudden changes in the vehicle's mean path 64.

For a heave sensor 14, as show FIG. 3, the parameters of a high pass filter 36 are, typically, adjustable. If those parameters are changed, the coefficients of the low pass filter 48 in the MPC 12 must also be changed to ensure the low pass filter 48 is still the complement of the high pass filter 36. The implementation of a filter in a system and the design of a low pass filter 48 that is the complement of a specified high pass filter 36 is well known to those skilled in the art.

Appendix A is a section of software written in Matlab® used to develop and test the depthimeter 10 using previously collected range and heave data. The software, which was written for the submerged vehicle application, includes implementation of the range compensator 46 and low pass filter 48. The software also includes a section that is used to compute the filter parameters of the low pass filter 48 given the parameters of the high pass filter 36. Although Matlab® was utilized in the development of this software program, C is the preferred language, however any scientific programming language may be utilized for similar programs.

Figure 8:
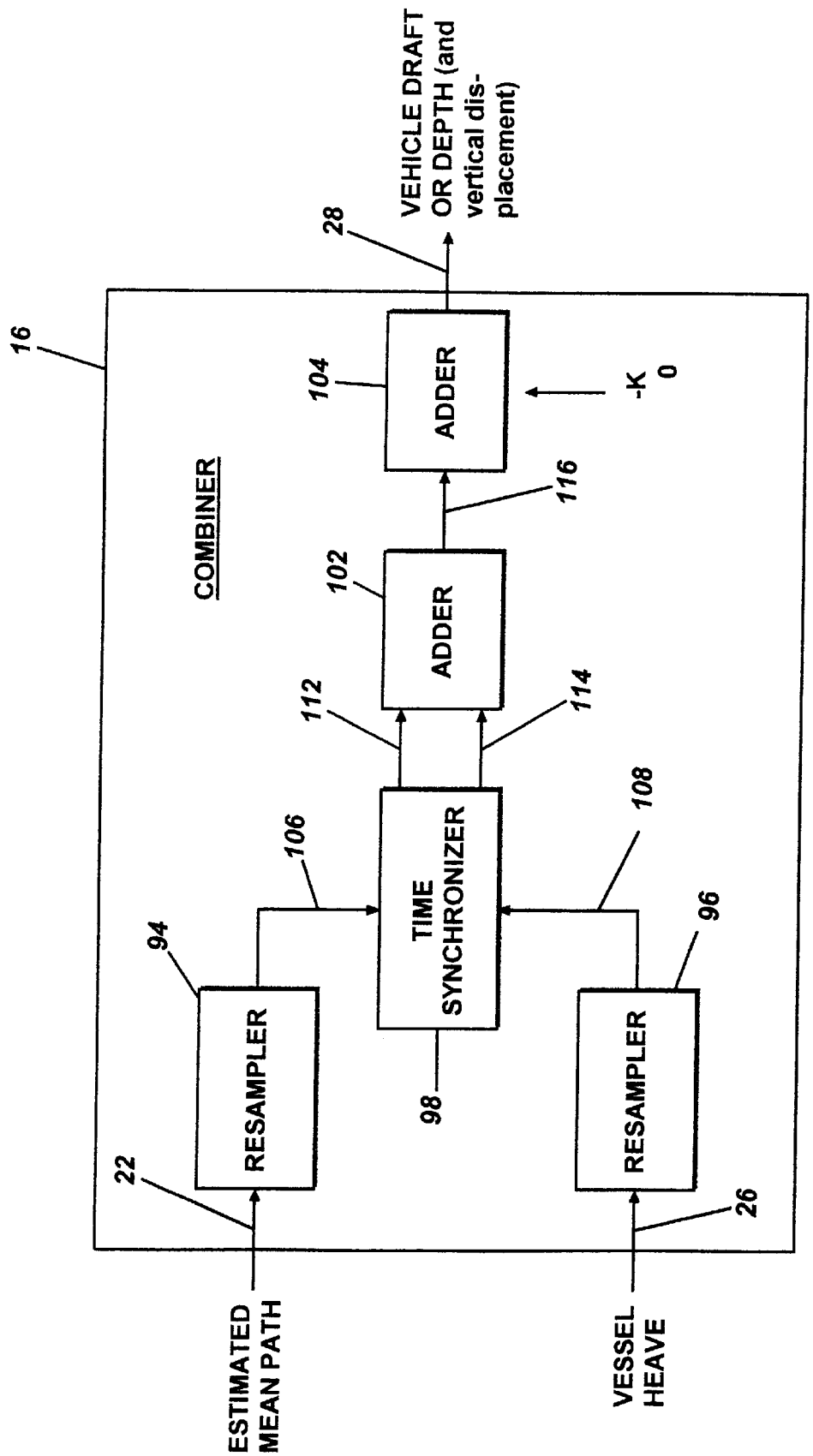
FIG. 8 shows a block diagram of a combiner.

The combiner 16, as shown in FIG. 8, is composed of two resamplers 94 and 96, a time synchronizer 98 and a pair of adders 102 and 104 in cascade. The combiner 16 receives the estimated mean path 22 from the MPC 12 and the vehicle heave 26 from the heave sensor 14. The output 28 of the combiner 16 is a signal that is the vehicle's 52 draft as a function of time, relative to mean sea level 68. This output 28 signal is also the vehicle's vertical displacement relative to mean sea level 68, as a function of time. Preferably, the combiner is a digital device however, an analog device may be used.

The resamplers 94 and 96 perform sampling of the estimated mean path data 22 and heave data 26, if necessary, to ensure these two data streams 22 and 26 are at the same sampling rates. The two data streams 22 and 26 must have the same sampling rates to allow subsequent time synchronization and addition of the resulting signals. This operation is not necessary if the mean path data 22 and the heave data 26 are originally sampled at the same rate. The inputs 22 and 26 to the samplers 94 and 96 are sampled at an arbitrary sampling rate (samples/second). For implementation with the depthimeter 10, the specified sampling rate is preferably 10 samples/second. Such resampling is well known to those skilled in the art.

The time synchronizer 98 synchronizes the estimated mean path data stream 106 and the vehicle 52 heave data stream 108 for subsequent addition in the adders 102 and 104 to produce a synchronized mean path data stream 112 and synchronized heave data stream 114. This operation is required so that the addition operation will add the synchronized heave data samples 114 and the synchronized mean path data samples 112 that correspond to the same instants in time. This operation is not necessary if the estimated mean path data 22 and the heave data 26 are originally sampled at the same instants of time. The inputs 106 and 108 to the time synchronizer 98 are the resampled estimated mean path 106 and resampled vehicle heave 108. Time synchronization of data signals is well known to those skilled in the art.

The first adder 102 adds the resampled and time synchronized estimated mean path 112 and the resampled and time synchronized vehicle heave 114 at each instant in time. The result of this addition operation is a signal 116 that is the vehicle's 52 vertical displacement relative to mean sea level 68, referenced to the vertical position of the ranging device 44.

The second adder 104 adds the vehicle's vertical displacement relative to mean sea level 68, referenced to the position of the ranging device 44, and $K_o$ 72, the ranging device 44 to keel 69 offset. $K_o$ is obtained from actual measurement or design drawings of the vehicle 52. For this operation, the additive inverse of $K_o$, i.e., $-K_o$, is added for the proper offset correction. The result of this addition operation is a signal 28 that is the vehicle's vertical displacement relative to mean sea level 68, referenced to the vehicle's keel 69. This signal 28 is also the vehicle's 52 draft. Addition of sampled signals and a constant value, $-K_o$, is well known to those skilled in the art.

Figure 9:
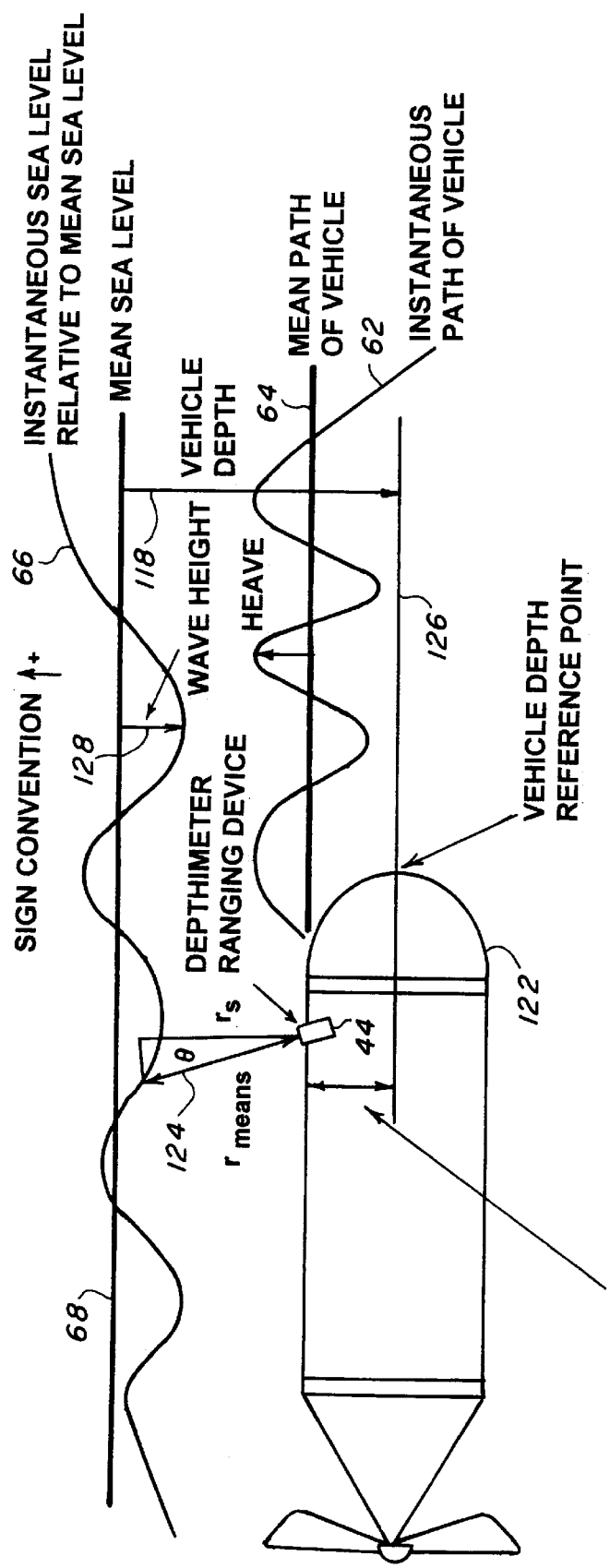
FIG. 9 shows a depthimeter for a submerged vehicle application.

In another preferred embodiment, the depthimeter 10, as shown in FIG. 2, is used for the determination of the depth of a sub-surface vehicle and for the determination of vertical displacement of the vehicle with respect to mean sea level, as shown in FIG. 9. For the sub-surface embodiment of the depthimeter 10, the output 28 of the depthimeter 10, shown in FIG. 2, is a signal that is the vehicle's 22 depth 118 as a function of time, relative to mean sea level 68. The output 31 is also the vehicle's 122 vertical displacement relative to mean sea level 66, as a function of time. The parameters measured by the depthimeter 10 in this embodiment are range 124, $r_{meas}$, from a fixed point on the vehicle to the water's surface or instantaneous sea level relative to mean sea level 66 and the vehicle's 112 vertical acceleration. Measurement of $r_{meas}$ 124 is accomplished by a ranging device 44 mounted on the hull of the vehicle 122. There are two significant components to $r_{meas}$ 124, first is the instantaneous vertical displacement of the vehicle 122 and the second is the instantaneous sea level relative to mean sea level 68. The instantaneous vertical displacement is a point on the instantaneous path of the vehicle 62, which varies about the mean path of the vehicle 64. The mean path of the vehicle 64 is referenced to the vertical position of the ranging device 44, but may be referenced to any other fixed vertical position on the vehicle 122. The mean sea level 68 is the mean of the instantaneous sea level 62 over time. Vehicle 122 vertical acceleration is the vertical component of the acceleration experienced by the vehicle 122 as it travels along the instantaneous path 62. Depth 118 is defined as the vertical distance between the vehicle's depth reference point 126 and the mean sea level 68. Depth of a sub-surface vehicle 122 may change with time due to changes in the commanded depth of the vehicle 122.

As in the surface vehicle 52 embodiment, the depthimeter 10 is composed of a mean path compensator 12 (MPC), a heave sensor 14 and a combiner 16, as shown in FIG. 2. The MPC 12 measures the range to the water surface 124 and generates a signal 22 that is the mean path of the vehicle relative to mean sea level 68. This signal may be time varying if the vehicle's 122 depth changes with time.

The heave sensor 14, as shown in FIG. 3, measures the vehicle's 122 vertical acceleration and generates a signal 26 that is the heave of the vehicle 122. Heave, in this embodiment, is the vertical displacement of the vehicle 122 from the mean path of the vehicle 64 to the instantaneous path of the vehicle 62; but heave can equally be defined as that component of the vehicle's 122 vertical displacement, with respect to a fixed vertical reference point, that is absent in the vehicle's mean path 64. The heave signal 26 does not contain information about the mean path of the vehicle 64 and cannot be used as the vertical displacement of the vehicle 122 after abrupt changes in the vehicle's mean path 64. Changes in a sub-surface vehicle's 122 mean path 64, i.e., depth, may occur due to changes in the command depth.

If the heave sensor 14 is not collocated with the ranging device 44, the heave measured at the position of the heave sensor 14 may not be the same as the position of the ranging device 44. If this is the case, then the heave data must be translated, using measured vehicle pitch and roll, to compute the heave of the vehicle 122 at the location of the ranging device. This may require an additional sensor, a vertical reference unit, for the measurement off vehicle 122 pitch and roll. If the POS/MV 320 system is utilized, it also measures vehicle 122 pitch and roll. Given measured pitch and roll, translation of the heave measurement is well known to those skilled in the art.

The MPC 12 is similar to that previously described and shown in FIG. 4, containing a ranging device 44, range compensator 46 and a low pass filter 48. The ranging device 44 is used to measure $r_{meas}$ 124, the instantaneous rage from a fixed point on the vehicle 122 to the ocean surface 66 as a function of time. Measurement of range is accomplished by measuring the time required for a transmitted pulse to travel from the device 44 to the surface 66 and back to the device 44; the pulse would typically be acoustic for the ranges considered in this embodiment. The measured range signal 56 contains two components; first is the instantaneous vertical displacement of the vehicle 122 relative to mean sea level 68 and referenced to the vertical position of the ranging device 44, and secondly, the vertical motion of the sea surface 66 (wave height). A typical ranging device 44 for use in this application is a ST500 Precision Altimeter, manufactured by Tritech International Ltd. of Aberdeen, Scotland, United Kingdom, however any other suitable device may be utilized.

In the sub-surface embodiment the following mounting considerations for the ranging device 44 must be applied. First, if the sub-surface vehicle 122 travels near the surface of the water 66, then the vehicle 122 may leave a wake. The ranging device 44 must be oriented so that its beam strikes the water's surface 66 clear of the vehicle's 122 wake; the wake could cause an erroneous offset in the measured range. Typically this could be accomplished by mounting the ranging device 44 far forward of the vehicle 122. A second consideration is that the mounting of the ranging device 44 must be rigid to the hull of the vehicle 122. Any independent motion or vibration of the ranging device 44 with respect to the hull of the vehicle 122 hull mount may result in contamination of the measured range signal 56. Finally, the mounting of the ranging device 44 must be such that the angle, θ (in actual degrees), of the ranging device 44 with respect to the vehicle's 122 vertical reference is measurable. Since it is desired to measure the vertical distance, $r_s$, from the ranging device 44 to the sea surface 66, any angular offset of the ranging device 44 from the vertical must be known so that the measured non-vertical range, $r_{meas}$, can be corrected to produce the vertical range, $r_s$.

In selecting a ranging device 44 for the sub-surface installation the following considerations are involved. First, for ranging devices 44, the beam is usually directional, resulting in a finite angular beam width. The ranging device's 44 beam typically has a footprint 78 as discussed previously, and as depicted in FIG. 6, but inverted, that is circular when projected onto a flat surface perpendicular to the direction of the beam. The size of the beam's footprint 78 is a function of the beam width 74 and the range to the surface 76. A beam width 74 in the range of 5–30 degrees is likely adequate for most implementations. (The beam width of a Tritech ST500 ranging device is 6 degrees.) However, the following considerations must be applied to beam width 74: first, if the beam width 74 is too narrow, the beam may reflect off the water's surface 66 in the opposite direction, and the ranging device 44 would be unable to produce a valid range. Secondly, in general, the wider beam will not adversely impact the depthimeter's 10 operation. A wider beam again effectively low pass filters the measured range data, as in the previous embodiment. If the beam is very wide, then the vehicle's 122 bow wake, or protrusions from the vehicle's 122 hull could fall within the beam and contaminate the measured range signal.

A second consideration for the ranging device 44 is that the effective range of the ranging device 44 must be sufficient considering the anticipated depth of the vehicle 122 below the surface 66 and the anticipated wave heights 128. In a third consideration, the resolution and accuracy of the ranging device 44 dictates in part the overall accuracy of the depthimeter 10. An accuracy of 5 cm or less is likely sufficient for most implementations. The resolution should be smaller than the accuracy, 1 cm or less. In a third, and last, consideration for the ranging device 44, is the pulse repetition rate which has previously been discussed.

The range compensator 46, as in FIG. 7, and combiner 16, as in FIG. 8, perform as previously discussed. However, the output of the second adder 104 in the combiner 16 adds the vehicle's 122 vertical displacement relative to mean sea level, referenced to the vertical position of the ranging device 44., and $K_o$, the ranging device 44 to depth reference point offset. The resulting output 28 of this addition operation is a signal that is the vehicle's 122 vertical displacement referenced to the vehicle's 122 depth reference point 126. This signal 28 is also the vehicle's 122 depth 118 relative to mean sea level 68.

The depthimeter 10 bypasses the problems associated with the use of pressure sensors and corrects for the errors induced by wave action to produce accurate measurement of vehicle 52 and 122 draft or depth with respect to mean sea level 68. The depthimeter 10 compensates for the errors in vertical displacement from the heave sensor 14 by generating a vertical displacement signal that is referenced directly to mean sea level 68 instead of an unknown mean path. Since the draft of a surface vehicle 52 or the depth of a sub-surface vehicle 122 signal produced by the depthimeter 10 is a non-constant function of time, this signal is also the vertical displacement of the vehicle 52 or 122 referenced to mean sea level 68.

Although the invention has been described in relation to an exemplary embodiment thereof, it will be understood by those skilled in the art that still other variations and modifications can be affected in the preferred embodiment without detracting from the scope and spirit of the invention as described in the claims.

---

APPENDIX A function meandepth = afilter(altitude,d)
%AFILTER    filter altimeter data with dropouts
%            This filter is designed to estimate mean path of
%            the ORCA to exactly compliment the heave as measured
%            by the POS/MV

APPENDIX A

```
%
%         Syntax:
%              meandepth = afilter(altitude)
%         Input:
%              altitude    input data   dropout: -1, valid range 0 to 5
%              d           initial value of depth used on short sequences
%                          to alleviate transients
%         Output:
%              meandepth mean depth of ORCA (positive upward)
%ABM 12/10/97
% filter coefficients (double precision required)
b = [ 0.0152645085649112; -0.0304332116981941; 0.0151689511834963 ];
a = b + [-3.0; 3.0; -1.0];
% find beginning of good data in altitude
start=1;
while (altitude(start)<0 | altitude(start)>5)
      start=start+1;
end
% replace initial data point with first good value
altitude(1)=altitude(start);
% if user didn't provide initial depth, make one up
if nargin<2, d=altitude(start); and
% compute initial values of states using initial depth
x = d/sum(b)*ones(3,1);
% setup storage
meandepth=zeros(size(altitude));
% now do filtering
for i=1;length(altitude)
      if    (altitude(i)<0 | altitude(i)>5)
      % hold last value
else
      % update states
      x0 = altitude(i) - a'*x;
      x(3) = x(2);x(2) = x(1) =x0;
      % compute output
      d = b'*x;
      end
      meandepth(i)=-d;
end
------------------------------------------------------------------------
% MATLAB script to generate digital filter parameters
% for altimeter to :
% analog filter
% HP*Integrator^2
%
%       G(s) = ─────────────────────────
%              s^3 + g1*s^2 + g2*s + g3
% xi=1/sqrt(2);
%xi = 0.707
w0=2*pi/200
g1 = w0*(2*xi+1);
g2 = (w0^2)*(2*xi+1);
g3 = w0^3;
% Interagator
%
%       I(s) = ───
%               s^2
%

% HP
%
%                     s^3
%       H(s) = ─────────────────────────
%              s^3 + g1*s^2 + g2*s + g3
%

Aa = [1;g1;g2;g3];
Ba = [1;0;0;0];
% Complementary LP
%
%                         g1*s^2 + g2*s + g3
%       L(s) = 1 - H(s) = ─────────────────────────
%                         s^3 + g1*s^2 + g2*s + g3
%
Ba = Aa-Ba;
% digital filter
fs=5;
% Let s = fs*(1-z^{-1})
% Then
% g1*s^2 + g2*2 + g3 ->
%     (g1*fs^2+2+g2*fs+g3) + (-2*g1fs^2-g2*fs)*z^-1 + (g1*fs^2)*z^-2
```

-continued

APPENDIX A

```
%    = B(z)
B = [g1*fs^2+g2*fs+g3;-(2*g1fs^2+g2*fs);g1*fs^2];
% and
% s^3 -> fs^3*(1 - 3*z^-1 + 3*z^-2 - z^3)
% and so
A = fs^s3*[1;-3;-1]+ [0;B];
% normalize
B = B/A(1);
A + A/A(1);
% test
theta = logspace(-3,pi,1000)';
H = freqz(B,A,theta);
Ha = freqs(Ba,Aa,theta*fs);
semilogx(thets,0*log10(abs([H Ha])));
```

What is claimed:

1. A device for accurate measurement of a sub-surface vehicle's depth relative to mean sea level comprising:
    means for measuring the vehicle's motion about a mean path;
    means for measuring the vehicle's mean path relative to mean sea level; and
    means for combining the vehicle's motion about a mean path and the vehicle's mean path relative to mean sea level to produce the vehicle's depth relative to mean sea level.

2. A device, as in claim 1, wherein the means for measuring a vehicle's motion about a mean path is a heave sensor.

3. A device, as in claim 2, wherein the heave sensor is comprised of an accelerometer, a double integrator and a high pass filter.

4. A device, as in claim 1, wherein the means for measuring a vehicle's mean path relative to mean sea level is a mean-path compensator.

5. A device, as in claim 4, wherein the mean-path compensator is comprised of a ranging device, range compensator and a low-pass filter.

6. A device, as in claim 5, wherein the mean-path compensator is further comprised of a vertical reference unit for correcting the measured range from the ranging device for its altitude.

7. A device, as in claim 1, wherein the means for combining the estimated mean path relative to mean sea level and the vehicle's motion about the mean path to produce the vehicle's depth relative to mean sea level is a combiner.

8. A device, as in claim 7, wherein the combiner is an analog device.

9. A device, as in claim 7, wherein the combiner is a digital device.

10. A device, as in claim 3, wherein the accelerometer, double integrator and high-pass filter are analog devices.

11. A device, as in claim 3, wherein the accelerometer, double integrator and high-pass filter are digital devices.

12. A device, as in claim 5, wherein the ranging device, range compensator and low-pass filter are analog devices.

13. A device, as in claim 5, wherein the ranging device, range compensator and low-pass filter are digital devices.

14. A device for accurate measurement of a sub-surface vehicle's depth relative to mean sea level comprising:
    a heave sensor for measuring the vehicle's motion about a mean path;
    a mean-path compensator for measuring the vehicle's mean path relative to mean sea level; and
    a combiner for combining the vehicle's motion about a mean path and the vehicle's mean path relative to mean sea level to produce the vehicle's depth relative to mean sea level.

15. A device for accurate measurement of a sub-surface vehicle's depth relative to mean sea level comprising:
    an accelerometer, double integrator and high-pass filter for measuring the vehicle's motion about a mean path;
    a ranging device, range compensator and low-pass filter for measuring the vehicle's mean path relative to mean sea level; and
    a combiner for combining the vehicle's motion about a mean path and the vehicle's mean path relative to mean sea level to produce the vehicle's depth relative to mean sea level.

16. A device for accurately measurement of a surface vehicle's draft relative to mean sea level, comprising:
    means for measuring the vehicle's motion about a mean path;
    means for measuring the vehicle's mean path relative to mean sea level; and
    means for combining vehicle motion about a mean path and the vehicle's mean path relative to mean sea level to produce the vehicle's draft relative to mean sea level.

17. A device, as in claim 16, wherein the means for measuring a vehicle's motion about a mean path is a heave sensor.

18. A device, as in claim 17, wherein the heave sensor is comprised of an accelerometer, a double integrator and a high pass filter.

19. A device, as in claim 16, wherein the means for measuring a vehicle's mean path relative to mean sea level is a mean-path compensator.

20. A device, as in claim 19, wherein the mean-path compensator is comprised of a ranging device, range compensator and a low-pass filter.

21. A device, as in claim 20, wherein the mean-path compensator is further comprised of a vertical reference unit for correcting the measured range from the ranging device for its altitude.

22. A device, as in claim 16, wherein the means for combining the estimated mean path relative to mean sea level and the vehicle's motion about the mean path to producer the vehicle's depth relative to mean sea level is a combiner.

23. A device, as in claim 22, wherein the combiner is an analog device.

24. A device, as in claim 22, wherein the combiner is a digital device.

25. A device, as in claim 18, wherein the accelerometer, double integrator and high-pass filter are analog devices.

26. A device, as in claim 18, wherein the accelerometer, double integrator and high-pass filter are digital devices.

27. A device, as in claim 20, wherein the ranging device, range compensator and low-pass filter are analog devices.

28. A device, as in claim 20, wherein the ranging device, range compensator and low-pass filter are digital devices.

29. A device for accurate measurement of a surface vehicle's draft relative to mean sea level, comprising:
   a heave sensor for measuring the vehicle's motion about a mean path;
   a mean-path compensator for measuring the vehicle's mean path relative to mean sea level; and
   a combiner for combining vehicle motion about a mean path and the vehicle's mean path relative to mean sea level to produce the vehicle's draft relative to mean sea level.

30. A device for accurate measurement of a surface vehicle's draft relative to mean sea level, comprising:
   an accelerometer, double integrator and high-pass filter for measuring the vehicle's motion about a mean path;
   a ranging device, range compensator and low-pass filter for measuring the vehicle's mean path relative to mean sea level; and
   a combiner for combining vehicle motion about a mean path and the vehicle's mean path relative to mean sea level to produce the vehicle's draft relative to mean sea level.

31. A method for accurate measurement of a sub-surface vehicle's depth relative to mean sea level comprising the steps of:
   measuring the vehicle's motion about a mean path;
   measuring the vehicle's mean path relative to mean sea level; and
   combining the vehicle's motion about a mean path and the vehicle's mean path relative to mean sea level to produce the vehicle's depth relative to mean sea level.

32. A method for accurate measurement of a surface vehicle's draft relative to mean sea level, comprising the steps of:
   measuring the vehicle's motion about a mean path;
   measuring the vehicle's mean path relative to mean sea level; and
   combining vehicle motion about a mean path and the vehicle's mean path relative to mean sea level to produce the vehicle's draft relative to mean sea level.

* * * * *